US007701658B2

(12) United States Patent
Mauti, Jr.

(10) Patent No.: US 7,701,658 B2
(45) Date of Patent: Apr. 20, 2010

(54) VEHICLE SYSTEM AND METHOD FOR PREPARING AN IN-VEHICLE DEVICE

(75) Inventor: Thomas K. Mauti, Jr., Sterling Heights, MI (US)

(73) Assignee: Gerneral Motors LLC, Detroit, MI (US)

( * ) Notice: Subject to any disclaimer, the term of this patent is extended or adjusted under 35 U.S.C. 154(b) by 428 days.

(21) Appl. No.: 11/693,133

(22) Filed: Mar. 29, 2007

(65) Prior Publication Data

US 2008/0238642 A1 Oct. 2, 2008

(51) Int. Cl.
*G11B 21/02* (2006.01)

(52) U.S. Cl. .............................. 360/69; 360/75; 701/36

(58) Field of Classification Search ................. 340/436, 340/438–440, 669; 701/36; 360/69, 75; 714/1, 100; 381/86
See application file for complete search history.

(56) References Cited

U.S. PATENT DOCUMENTS

| | | | | |
|---|---|---|---|---|
| 5,546,755 | A * | 8/1996 | Krieger | 62/133 |
| 5,809,437 | A * | 9/1998 | Breed | 701/45 |
| 7,161,758 | B2 | 1/2007 | Adapathya et al. | |
| 7,477,469 | B2 * | 1/2009 | Cook et al. | 360/75 |
| 2004/0252403 | A1 * | 12/2004 | Wehrenberg | 360/75 |
| 2007/0015485 | A1 * | 1/2007 | DeBiasio et al. | 455/345 |

* cited by examiner

*Primary Examiner*—Thomas J Mullen
(74) *Attorney, Agent, or Firm*—Dierker & Associates, P.C.

(57) ABSTRACT

A method for preparing an in-vehicle device includes monitoring a communication bus for one or more messages. The method also includes determining if at least one of the one or more messages corresponds with a message in a list of messages indicative of a change in vehicle state. Data is extracted from the at least one message that corresponds with the message in the list of messages. A signal is transmitted to the in-vehicle device based on the extracted data. A vehicle system that implements the method is also disclosed herein.

19 Claims, 2 Drawing Sheets

VEHICLE SYSTEM AND METHOD FOR PREPARING AN IN-VEHICLE DEVICE

TECHNICAL FIELD

The present disclosure relates generally to a vehicle system and a method for preparing an in-vehicle device.

BACKGROUND

Portable electronic equipment is often provided with "locking" devices that lock certain internal components, such as hard drives, in the event that the equipment is dropped. The internal component, when locked, is placed in a state in which data on the device and the mechanism of the component may be more likely to survive the dropping event. A sensor within the internal component may be used to trigger the locked state.

As more electronic components are added to vehicles, it is desirable to control those devices within the automobile that may benefit from having a "locked" state during certain vehicle events.

SUMMARY

A method for preparing an in-vehicle device includes monitoring a communication bus for one or more messages. The method also includes determining if at least one of the one or more messages corresponds with a message in a list of messages indicative of a change in vehicle state. Data is extracted from the at least one message that corresponds with the message in the list of messages. A signal is transmitted to the in-vehicle device based on the extracted data.

A vehicle system includes a first unit for sensing and processing data indicative of a vehicle state, a communication bus that is coupled to the first unit, and a second unit that is coupled to the communication bus. The second unit includes a device with a park mode and an operating mode. The second unit activates the park mode in response to a signal received from the first unit indicating that the vehicle state has changed.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

DETAILED DESCRIPTION OF THE EMBODIMENTS

Embodiment(s) of the method and system disclosed herein advantageously prepare in-vehicle devices when changes in vehicle behavior are detected. The method and system utilize different vehicle components to monitor and detect actual or potential changes in vehicle behavior. When such changes are recognized, the in-vehicle device(s) are put into park, stop, or off mode. It is believed that parking or stopping the device prepares the device and may reduce the likelihood of damage to the device when the vehicle behavior changes substantially.

It is to be understood that, as defined herein, a user may include a service subscriber and/or a vehicle operator/passenger.

It is to be further understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct communication and indirect communication. As used herein, indirect communication is to be interpreted to include communication between two components having additional component(s) located therebetween.

Figure 1:
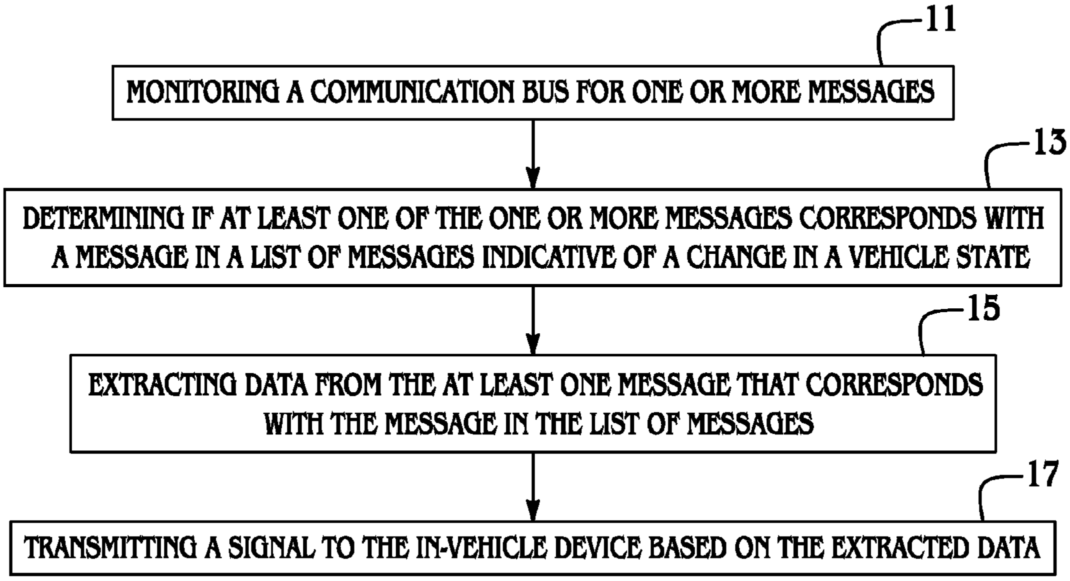
FIG. 1 is a flowchart depicting an embodiment of a method of preparing an in-vehicle device.

Referring now to FIG. 1, an embodiment of the method of preparing an in-vehicle device is depicted. The method includes monitoring a communication bus for one or more messages, as shown at reference numeral 11; determining if at least one of the one or more messages corresponds with a message in a list of messages indicative of a change in a vehicle state, as shown at reference numeral 13; extracting data from the at least one message that corresponds with the message in the list of messages, as shown at reference numeral 15; and transmitting a signal to the in-vehicle device based on the extracted data, as shown at reference numeral 17. It is to be understood that embodiments of the method will be discussed in further detail in reference to FIGS. 2 and 3.

Figure 2:
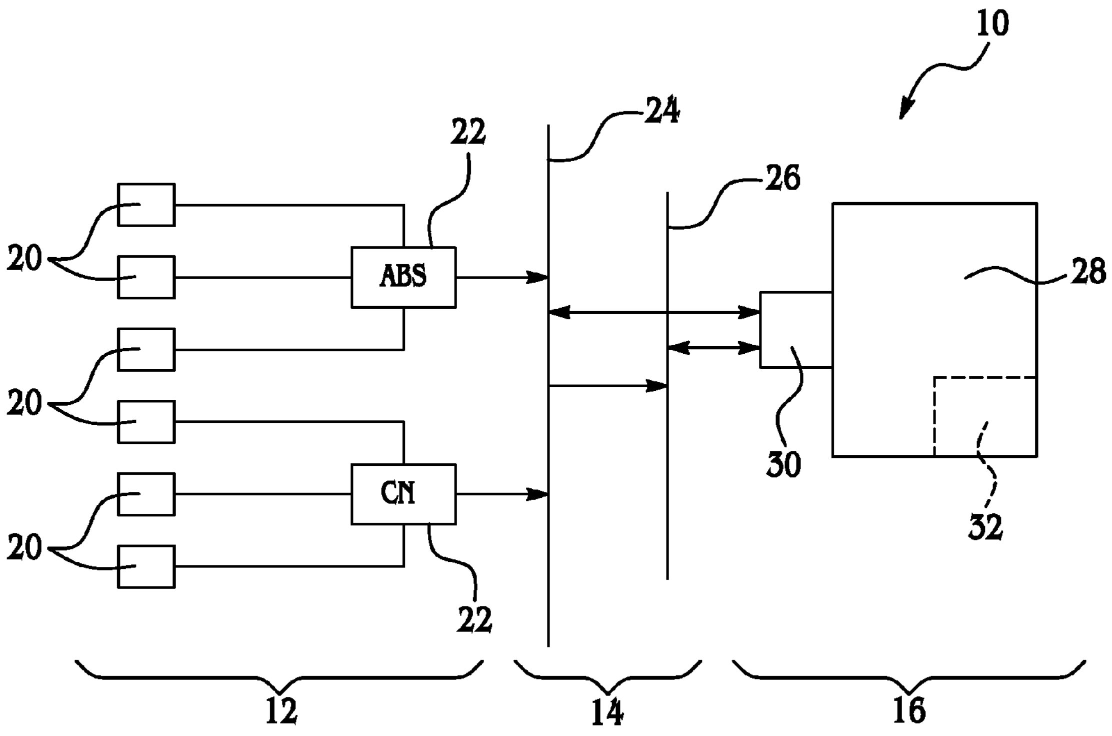
FIG. 2 is a schematic diagram depicting an embodiment of a vehicle system for preparing an in-vehicle device.

Referring now to FIG. 2, an embodiment of the vehicle system 10 for preparing an in-vehicle device 12 is depicted. The system 10 includes a first unit 12, a communication bus 14, and a second unit 16. It is to be understood that the components of the system 10 are located within or on the vehicle 18, shown in FIG. 3.

The first unit 12 senses and processes data indicative of a vehicle state. Generally, the first unit 12 includes sensor(s) 20 that are located within the vehicle 18 or on the exterior of the vehicle 18. The sensor(s) 20 sense one or more conditions of the vehicle 18 (i.e., vehicle state). Such conditions may include vehicle speed, acceleration, and/or deceleration, wheel slip, brake application, engine torque, steering wheel angle, rollover status, chassis status, and/or the like, and/or combinations thereof. Non-limiting examples of such sensors 20 include vehicle collision sensors, vehicle pre-collision sensors, accelerometers, inclinometers, gyroscopes (e.g., turn rate sensors), magnetic compasses, and/or the like, and/or combinations thereof. Upon sensing the condition or vehicle state, the sensor(s) 20 generate data indicative of the condition.

The first unit 12 also includes one or more sensor modules 22. Each sensor(s) 20 is operatively connected to a sensor module 22. As depicted in FIG. 2, multiple sensors 20 may be operatively connected to one sensor module 22. It is to be understood, however, that one sensor 20 may be operatively connected to one sensor module 22. Furthermore, any number of sensor modules 22 may be used in the system 10. Non-limiting examples of sensor modules 22 include an ABS braking system module, a collision notification (CN) module, and/or other like vehicle modules, and/or combinations thereof. The module(s) 22 receives sensed data from the respective sensor(s) 20 operatively connected thereto. The module(s) 22 then process the received data and formulate one or more messages based on such data. As such, the formulated messages are indicative of the sensed vehicle state/condition.

As shown in FIG. 2, the first unit 12 is operatively connected to or in communication with the communication bus 14. More specifically, the module(s) 22 of the first unit 12 are in direct communication with the system bus 24 of the communication bus 14. In some embodiments, the communication bus 14 includes the system bus 24 and an audio bus 26. The messages formulated by the module(s) 22 are passed from the respective modules 20 to the system bus 24, and if present, to the audio bus 26.

As previously stated, the system 10 also includes the second unit 16, which is operatively connected or coupled to the communication bus 14, via the system bus 24 or the audio bus 26. It is to be understood, as shown in FIG. 2, that the second unit 16 may be directly connected to the system bus 24, or may be connected to the system bus 24 via, for example, the audio bus 26. The second unit 16 includes the in-vehicle device 28 and a bus message listener 30.

The in-vehicle device 28 is switchable between a park/stop/off mode and an operating/on mode. In an embodiment, the in-vehicle device 28 is a vehicle multimedia system, a vehicle audio system, and/or combinations thereof. The device 28 may include a hard drive 32, a motor, a laser mechanism, a media read head mechanism, or other parts that operate the device 28.

The bus message listener 30 monitors the communication bus 14 for the message(s) sent from the first unit 12. The bus message listener 30 scans the message(s) for content that indicates a change or an impending change in the vehicle state/condition. As examples, two messages of interest to the bus message listener 28 may include input or data of a braking condition that indicates a potentially abrupt stop of the vehicle, or input or data indicating an actual vehicle collision. The messages of interest to the bus message listener 30 may also include those messages that contain wheel slip data (e.g., front and/or rear wheel slip), brake application status (e.g., antilock brake system indication on, actual vehicle acceleration), engine torque status (e.g., accelerator effective position, accelerator effective position validity), steering wheel angle (e.g., vehicle dynamics yaw rate), rollover status (e.g., rollover sensor fault status, rollover event classification type), chassis status (e.g., brake pedal driver applied pressure detected, vehicle stability enhancement lateral acceleration), or the like, or combinations thereof.

The bus message listener 30 stores a list of messages to monitor. The list of messages generally contains the type of message content for which the bus message listener 30 is listening or monitoring. Such a list may be delivered to the bus message listener 30 from the telematics unit (shown as reference numeral 34 in FIG. 3). Further, such a list may be compiled at and updated by the call center 36, which is in operative communication with the telematics unit 34, described further hereinbelow. The call center 36 sends the list to the telematics unit 34, which transmits the list to the bus message listener 30.

The bus message listener 30 monitors the messages received by the communication bus 14 from the first unit 12 to determine if at least one of the messages corresponds with a message in the list of messages stored therein. In an embodiment, the bus message listener 30 monitors the communication bus 14 substantially continuously or at predetermined intervals. Substantially continuous monitoring generally means that the bus message listener 30 monitors the communication bus 14 in near real time as soon as the vehicle 18 is turned on until the vehicle 18 is turned off. An interrupt in the substantially continuous monitoring is generated if a message of interest is detected.

The bus message listener 30 compares the content of the messages received by the communication bus 14 with the content of the messages stored in the list. If the content of one or more of the monitored messages is found to match a message in the list, then the listener 30 extracts and examines the data from the monitored message. In a non-limiting example, the received message may be encoded in a binary string and compared to a binary string representing the message stored in the list. If the strings match, then the bus message listener 30 extracts the data from the received message. As described further herein, the bus message listener 30, responsive to an incoming message that matches a message in the list, generates an interrupt that is recognized and acted upon by device 28.

As previously stated, the data is indicative of a sensed vehicle state/condition. Upon examination of the data, the bus message listener 30 determines whether the vehicle state/condition has changed. Generally, the bus message listener 30 is looking for substantially rapid changes in vehicle behavior that indicate impending or actual incidences potentially likely to cause damage to the vehicle 18 and/or to the device 28 (e.g., hitting a pothole). In an embodiment, the state/condition changes that the bus message listener 30 is looking for are those that indicate that the state/condition has exceeded a predetermined threshold or is outside a predetermined range. Generally, the predetermined threshold or range is particular to a vehicle state/condition and represents states/conditions at which the device 28 is able to activate the operating/on mode substantially without sustaining damage thereto. When the detected change indicates that it has exceeded the particular threshold or is outside the particular range, it may be desirable to activate the park/stop/off mode of the device 28. As a non-limiting example, the predetermined threshold for brake application status may be when the antilock braking system is engaged. As another non-limiting example, a significant change in brake or throttle condition within a certain amount of time may be outside a predetermined range of suitable brake or throttle condition changes.

If the extracted data indicates that such a change in vehicle state/condition has occurred, the bus message listener 30 transmits a signal to the device 28 to activate the park/stop/off mode. The signal is received by the device 28, which, in response, activates the park/stop/off mode. In an embodiment, activating the park/stop/off mode includes the in-vehicle device 28 parking a hard drive head, stopping a hard drive platter, stopping a compact disc player motor, stopping a digital video disc player motor, stopping a compact disc player laser mechanism, stopping a digital video disc player laser mechanism, stopping a blue-violet laser optical storage disk (e.g., BLU-RAY®) motor and/or laser mechanism, stopping a high-definition digital video disk player motor and/or laser mechanism, and/or the like, and/or combinations thereof. It is believed that by activating the park/stop/off mode when such vehicle changes are detected, the system 10 may substantially reduce the risk of damaging the device 28 components.

Figure 3:
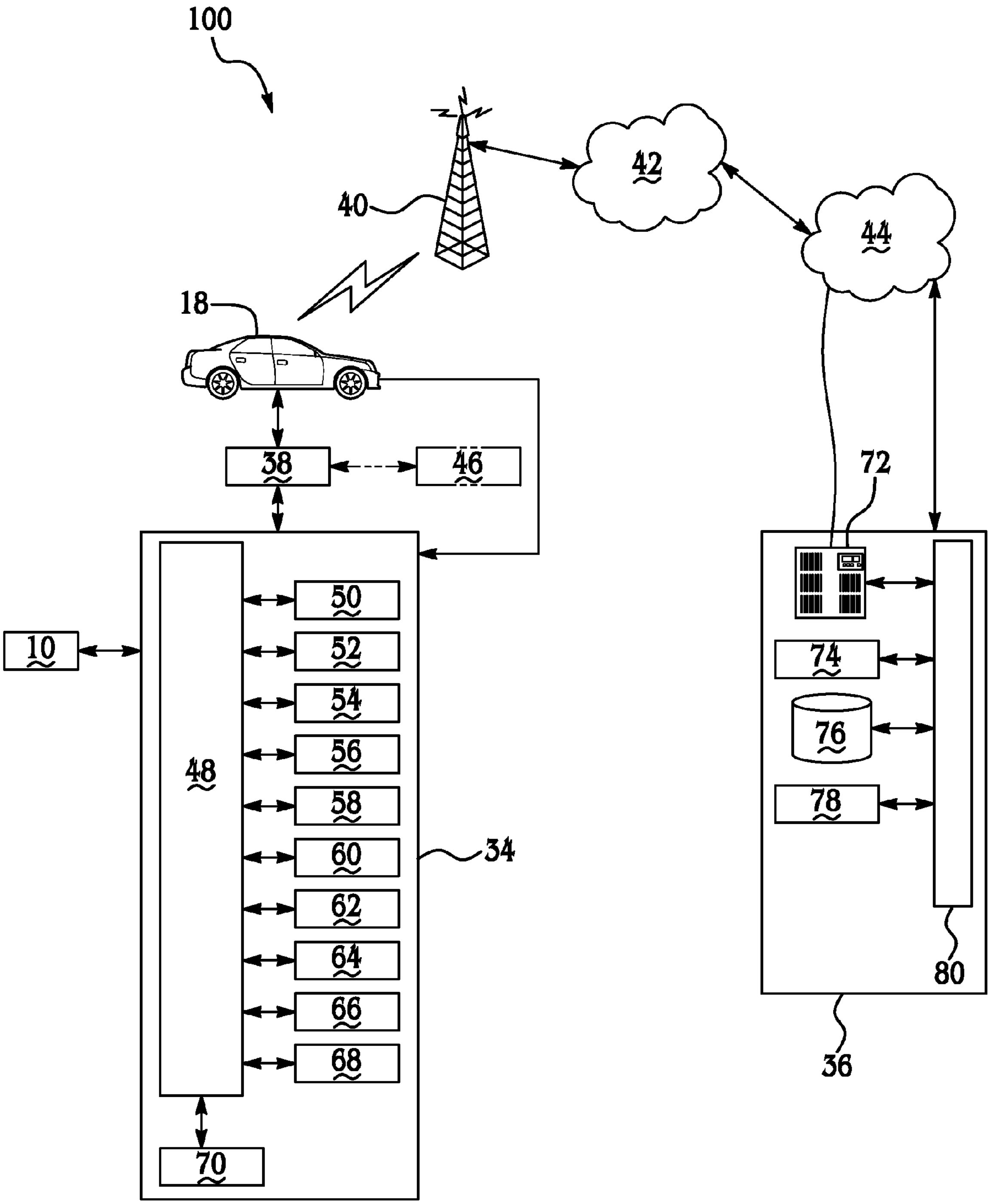
FIG. 3 is a schematic diagram depicting an embodiment of a system including the system shown in FIG. 2, an in-vehicle telematics unit, a wireless communication system, and a call center.

Referring now to FIG. 3, an embodiment of a communication system 100 including the vehicle system 10 is depicted. The communication system 100 includes the vehicle 18, the vehicle system 10, a vehicle communications network 38, the telematics unit 34, a wireless communication system (including, but not limited to, one or more wireless carrier systems 40, one or more communication networks 42, one or more land networks 44), and one or more call centers 36. In an embodiment, the wireless communication system is a two-way radio frequency communication system. In yet another embodiment, vehicle 18 is a mobile vehicle with suitable hardware and software for transmitting and receiving voice and data communications. System 100 may include additional components suitable for use in telematics units 34.

In an embodiment, via vehicle communications network 38, the vehicle 18 sends signals from the telematics unit 34 to various units of equipment and systems 38 within the vehicle 18 to perform various functions, such as unlocking a door, executing personal comfort settings, and/or the like. In facilitating interaction among the various communications and electronic modules, vehicle communications network 46 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 34 may send and receive radio transmissions from wireless carrier system 40. In an embodiment, wireless carrier system 40 may be a cellular telephone system and/or any other suitable system for transmitting signals between the vehicle 18 and communications network 42. Further, the wireless carrier system 40 may include a cellular communication transceiver, a satellite communications transceiver, a wireless computer network transceiver (a non-limiting example of which includes a Wide Area Network (WAN) transceiver), and/or combinations thereof.

Telematics unit 34 may include a processor 48 operatively coupled to a wireless modem 50, a location detection system 52 (a non-limiting example of which is a global positioning system (GPS)), an in-vehicle memory 54, a microphone 56, one or more speakers 58, an embedded or in-vehicle mobile phone 60, a real-time clock (RTC) 62, a short-range wireless communication network 64 (e.g. a BLUETOOTH® unit), a user interface 66, and/or a user interface panel 68.

As previously described in reference to FIG. 2, the telematics unit 34 is operatively connected to the bus message listener 30 of the system 10 for transmitting the message list and other communications to the system 10. It is to be understood that the bus message system 30 is also capable of transmitting signals to the telematics unit 34, and thus to the call center 36.

Further, telematics unit 34 may include additional components and functionality as desired for a particular end use. It is to be understood that the telematics unit 34 may also be implemented without one or more of the above listed components, such as, for example, speakers 58. Additionally, it is to be understood that the speaker(s) 58 may be a component of the device 28 (for example, when the device 28 is a multimedia and/or audio system).

In an embodiment where the device 28 is a multimedia and/or audio system, the device 28 may be configured, in addition to accepting and outputting radio broadcasts, to accept and output audio and other signals. The device 28 may be adapted to output audio signals (i.e., an audio output) embodied in one or more of a variety of formats. For example, the device 28 may output audio signals from the telematics unit 34, FM radio, AM radio, satellite radio, a compact disc (CD), a digital audio file (such as, for example, an .mp3 file), a cassette tape, a minidisk, and/or combinations thereof.

Processor 48 may be a micro controller, a controller, a microprocessor, a host processor, and/or a vehicle communications processor. In another embodiment, processor 48 may be an application specific integrated circuit (ASIC). Alternatively, processor 48 may be a processor working in conjunction with a central processing unit (CPU) performing the function of a general-purpose processor.

Non-limiting examples of the location detection system 52 associated with processor 48 include a Global Position Satellite receiver, a radio triangulation system, a dead reckoning position system, and/or combinations thereof. In particular, a GPS receiver provides accurate time and latitude and longitude coordinates of the vehicle 18 responsive to a GPS broadcast signal received from a GPS satellite constellation (not shown).

In-vehicle mobile phone 60 may be a cellular type phone, such as, for example an analog, digital, dual-mode, dual-band, multi-mode and/or multi-band cellular phone.

Also associated with processor 48 is the previously mentioned real time clock (RTC) 62, which provides accurate date and time information to the telematics unit hardware and software components that may require date and time information. In one embodiment, date and time information may be requested from the RTC 62 by other telematics unit components. In other embodiments, the RTC 62 may provide date and time information periodically, such as, for example, every ten milliseconds.

Processor 48 may execute various computer programs that interact with operational modes of electronic and mechanical systems within the vehicle 34. It is to be understood that processor 48 controls communication (e.g., call signals) between system 10, telematics unit 34, wireless carrier system 40, and call center 36.

Further, processor 48 may generate and accept digital signals transmitted between the telematics unit 34 and the vehicle communication network 38, which is connected to various electronic modules in the vehicle 18. In one embodiment, these digital signals activate the programming mode and operation modes within the electronic modules, as well as provide for data transfer between the electronic modules. In another embodiment, certain signals from processor 48 may be translated into vibrations and/or visual alarms.

It is to be understood that software 70 may be associated with processor 48 for monitoring and/or recording the incoming caller utterances and/or data transmissions.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 18 and the land network 44.

The land network 44 connects the communications network 40 to the call center 46. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46.

Call center 46 may contain one or more data switches 72, one or more communication services managers 74, one or more communication services databases 76 containing, for example, subscriber profile records and/or subscriber information, one or more communication services advisors 78, and one or more network systems 80.

It is to be understood that, although a service provider may be located at the call center 36, the call center 36 is a separate and distinct entity from the service provider. In an embodiment, the service provider is located remote from the call center 36. A service provider provides the user with telephone and/or Internet services. In an embodiment, the service provider is a wireless carrier (such as, for example, Verizon Wireless®, Cingular®, Sprint®, etc.). It is to be understood that the service provider may interact with the call center 36 to provide service(s) to the user.

Switch 72 of call center 36 may connect to land network 44. Switch 72 may transmit voice or data transmissions from call center 36, and may receive voice or data transmissions from telematics unit 34 in vehicle 18 through wireless carrier system 40, communications network 42, and land network 44. As such, a connection between the telematics unit 34 and the call center 36 may be established via the wireless carrier system 40, communications network 42, and/or land network 44. Switch 72 may receive data transmissions from, or send data transmissions to one or more communication service managers 74, via one or more network systems 80.

Call center 36 may contain one or more service advisors 78. In one embodiment, the service advisor 78 is human. In another embodiment, a service advisor 78 is an automaton. It is to be understood that the service advisor 78 may be located at the call center 36 or may be located remote from the call center 36 while communicating therethrough.

Communication may be accomplished via voice mode or data mode. Voice mode communications generally occur between the user and the service advisor 78 or some other third party. Data mode communications generally occur between the telematics unit 34 and components of the call center 36 or service provider. Data mode is used, for example, to send the list of messages from the call center 36 to the telematics unit 34. In an embodiment, the communication is established via a connection extending (e.g., via the wireless communication system) between the telematics unit 34 and the call center 36.

In the embodiments disclosed herein, verbal communication (voice mode) may take place via microphone 56 coupled to the in-vehicle or mobile phone 60 associated with the telematics unit 34. In an embodiment, caller utterances into the microphone 56 are received at the call center 36, which may tokenize the utterance stream for further processing. In another embodiment, the tokenized utterances are placed in a subscriber information database 76 at the call center 36.

Communication between a telematics unit 34 user and a service advisor 78 (or between a telematics unit 34 and components of the call center 36) may be initiated automatically, or may be initiated by the user or the service advisor 78. In one embodiment, the call center 36 initiates communication with the telematics unit 34 in data mode to transmit data to and/or receive data from the telematics unit 34. In another embodiment, the user may initiate a call or a request via an input system (e.g., user interface 66 and/or user interface panel 68) in communication with the telematics unit 34 and/or the two-way radio frequency communication system. Initiation of the communication may be verbal and/or via a physical motion. As such, the input system may include an alphanumeric keypad, a microphone 56, a menu selection system, and/or combinations thereof.

As described herein, embodiment(s) of the method and systems 10, 100 disclosed herein advantageously prepare in-vehicle devices 28 when changes in one or more vehicle states/conditions are detected. When such changes are recognized, the in-vehicle device(s) 28 are activated in park, stop, or off mode, thereby reducing the likelihood of damage to the device 28 during such radical changes.

While several embodiments have been described in detail, it will be apparent to those skilled in the art that the disclosed embodiments may be modified. Therefore, the foregoing description is to be considered exemplary rather than limiting.

The invention claimed is:

1. A method for preparing an in-vehicle device, the method comprising:

monitoring a communication bus for one or more messages;

determining if at least one of the one or more messages corresponds with a message in a list of messages indicative of a change in a vehicle state;

extracting data from the at least one message that corresponds with the message in the list of messages; and transmitting a signal to the in-vehicle device based on the extracted data;

wherein the in-vehicle device is a multimedia system, an audio system, or combinations thereof, and wherein in response to receiving the transmitted signal, the in-vehicle device parks a hard drive head, stops a hard drive platter, stops a compact disc player motor, stops a digital video disc player motor, stops a compact disc player laser mechanism, stops a digital video disc player laser mechanism, or combinations thereof.

2. The method as defined in claim 1, further comprising:

sensing data indicative of a vehicle state;

processing the sensed data via at least one sensor module;

formulating, at the at least one sensor module, the at least one message based on the sensed data; and transmitting the at least one message to the communication bus.

3. The method as defined in claim 2 wherein the at least one sensor module is selected from an anti-lock braking system, a collision notification module, and combinations thereof.

4. The method as defined in claim 1 wherein the monitoring of the communication bus is accomplished via a bus message listener operatively connected to a multimedia system, an audio system, or combinations thereof.

5. The method as defined in claim 4 wherein prior to determining if the at least one message corresponds with the message in the list of messages, the method further comprises transmitting the list of messages to the bus message listener via an in-vehicle telematics unit.

6. The method as defined in claim 1 wherein the data is indicative of at least one of wheel slip, brake application status, engine torque status, steering wheel angle, rollover status, chassis status, speed status, or combinations thereof.

7. The method as defined in claim 1 wherein determining if the at least one message corresponds with the message in a list of messages includes comparing content of the at least one message with content of each message in the list of messages.

8. A vehicle system, comprising:

a first unit for sensing a vehicle state, generating data indicative of the sensed vehicle state, and processing the data indicative of the vehicle state;

a communication bus coupled to the first unit; and a second unit coupled to the communication bus including a device with a park mode and an operating mode, wherein the second unit activates the park mode in response to a signal received from the first unit indicating that the vehicle state has changed.

9. The system as defined in claim 8 wherein the vehicle state is selected from wheel slip, brake application status, engine torque status, steering wheel angle, rollover status, chassis status, speed status, and combinations thereof.

10. The system as defined in claim 8 wherein the first unit includes:

a sensor for sensing the data; and a sensor module for receiving the sensed data from the sensor, for processing the received data, and for formulating one or more messages based on the received data.

11. The system as defined in claim 10 wherein the sensor module is selected from an anti-lock braking system, a collision notification module, and combinations thereof.

12. The system as defined in claim 10 wherein the sensor is selected from a vehicle collision sensor, a vehicle pre-collision sensor, accelerometers, inclinometers, gyroscopes, magnetic compasses, and combinations thereof.

13. The system as defined in claim 8 wherein the communication bus is selected from a system bus, an audio bus, and combinations thereof.

14. The system as defined in claim 8 wherein the device is a multimedia system, an audio system, or combinations thereof.

15. The system as defined in claim 8 wherein the device includes a hard drive.

16. The system as defined in claim 8 wherein the second unit further includes a bus message listener operatively connected to the device and to the communication bus.

17. The system as defined in claim 16, further comprising an in-vehicle telematics unit operatively connected to the bus message listener.

18. The system as defined in claim 17 wherein the in-vehicle telematics unit is in operative communication with a call center.

19. A vehicle system, comprising:

at least one sensor for sensing a vehicle state and generating data indicative of the vehicle state;

at least one sensor module for receiving the sensed data from the at least one sensor, for processing the received data, and for formulating one or more messages based on the received data;

a communication bus for receiving the one or more messages;

a bus message listener for monitoring the one or more messages received by the communication bus, for determining if at least one of the one or more messages corresponds with a message in a list of messages indicative of a change in vehicle state, and for extracting the data from the at least one message that corresponds with the message in the list of messages; and an in-vehicle device with a park mode and an operating mode, the in-vehicle device configured to enter park mode upon receiving from the bus message listener a signal indicating that the vehicle state has exceeded a predetermined threshold or is outside a predetermined range.

* * * * *